United States Patent
Wielenga

[19]

[11] Patent Number: 6,065,558
[45] Date of Patent: May 23, 2000

[54] ANTI-ROLLOVER BRAKE SYSTEM

[75] Inventor: Thomas J. Wielenga, Ann Arbor, Mich.

[73] Assignee: Dynamotive, L.L.C., Ann Arbor, Mich.

[21] Appl. No.: 09/109,286

[22] Filed: Jun. 30, 1998

Related U.S. Application Data

[60] Provisional application No. 60/051,482, Jul. 1, 1997, and provisional application No. 60/056,302, Sep. 3, 1997.

[51] Int. Cl.$^7$ .................................................. B60K 28/14
[52] U.S. Cl. .......................................... 180/282; 180/197
[58] Field of Search ..................................... 180/197, 282; 303/181, 183, 194, 177; 318/585

[56] References Cited

U.S. PATENT DOCUMENTS

| | | | |
|---|---|---|---|
| 4,976,330 | 12/1990 | Matsumoto | 180/197 |
| 5,707,117 | 1/1998 | Hu et al. | 303/122 |
| 5,732,378 | 3/1998 | Eckert et al. | 701/83 |
| 5,762,406 | 6/1998 | Yasui et al. | 303/146 |
| 5,782,543 | 7/1998 | Monzaki et al. | 303/146 |
| 5,809,434 | 9/1998 | Ashrafi et al. | 701/1 |
| 5,857,535 | 1/1999 | Brooks | 180/41 |
| 5,869,943 | 2/1999 | Nakashima et al. | |

FOREIGN PATENT DOCUMENTS

| | | | |
|---|---|---|---|
| 19632943A1 | 2/1998 | Germany | B60T 8/60 |
| 2316455 | 2/1998 | United Kingdom | B60T 8/24 |

OTHER PUBLICATIONS

Tech Briefs, New Chasis Technology In The Japenese Accord—*Automotive Engineering*, 1997.

Integration of Chasis And Traction Control Systems What is Possible—What Makes Sense—What is Under Development, Wallentowitz et al., *AVEC*, 1992.

The Improvement of Vehicle Maneuverability by Direct Yaw Moment Control, Shibahata et al, *AVEC*, 1992.

Integrated Control Systems of 4WS and 4WD by H$^{\infty}$ Control, Hirano et al.

Yaw Rate Feedback Braking Force Districtuion Control With Control–By–Wire Brake System, Inagaki et al., *AVEC*, 1992.

A Stability Control Method for Articulated Vehicle at Braking, Kageyama, *AVEC*, 1992.

Integrated Chassis Control System For Improved Vehicle Dynamics, Sata et al., *AVEC*, 1992.

Improved Driving Stability by Active Braking of the Individual Wheels, Alberti et al., *The Aachen University of Technology*, Jun. 1996.

DSC (Dynamic Stability Control) in BMW 7 Series Cars, Straub, *AVEC*, 1996.

*Primary Examiner*—J. J. Swann
*Assistant Examiner*—Michael Cuff
*Attorney, Agent, or Firm*—Howard & Howard

[57] ABSTRACT

The present invention provides a brake system for preventing a friction rollover of a vehicle. The brake system includes a set of brakes for applying pressure to resist the rotation of the respective wheels of the vehicle, a sensor for producing a rollover signal in response to a predetermined force urging the vehicle to rollover, and a control for actuating the brakes in a predetermined program in response to the rollover signal. In one embodiment of the present invention, the controller actuates both front brakes in response to the rollover signal. In another embodiment of the present invention, the controller brakes the most heavily loaded front tire in response to the rollover signal.

28 Claims, 2 Drawing Sheets

ANTI-ROLLOVER BRAKE SYSTEM

This application claims the benefit of U.S. Provisional Application No. 60/051,482, filed Jul. 1, 1997, and U.S. Provisional Application No. 60/056,302, filed Sep. 3, 1997.

BACKGROUND OF THE INVENTION

1. Field of the Invention

The present invention relates to a brake system for preventing a friction rollover of a vehicle.

2. Description of the Related Art

Vehicle rollover accidents have recently received much attention as a product safety concern from the news media and in the judicial court system. Each year, vehicle rollover accidents seriously or fatally injure many vehicle occupants. A large number of these rollovers are single vehicle accidents occurring on dry, flat roads. Frequently, these on-road rollovers are induced solely by emergency steering maneuvers. Typically, in an attempt to avoid an impending collision a driver will steer their vehicle into a sharp emergency turn and thereby induce the rollover. This type of vehicle rollover is referred to as a friction rollover.

Friction rollovers are caused by forces of friction between the tires of the vehicle and the road. When the vehicle is turned sharply, the tires produce lateral forces. The lateral tire forces create a lateral acceleration on the center of mass of the vehicle. The lateral acceleration creates an opposing force referred to as a D'Alembert force. The D'Alembert force and the lateral tire forces act in combination to roll the vehicle outward during the turn. During some sharp turns, the combined forces are strong enough to roll the vehicle over.

Some modern vehicles, such as sport utility vehicles, light trucks, and vans, are more susceptible to friction rollovers than other vehicles. In general, these tall and narrow vehicles are top heavy, that is have a high center of gravity. As a result, sport utility vehicles, light trucks, and vans are more likely to rollover during a sharp emergency steering maneuver. Accordingly, it would be desirable to provide a simple and inexpensive vehicle brake system for preventing friction rollovers.

SUMMARY OF THE INVENTION

The present invention provides a brake system for preventing a friction rollover of a vehicle. The brake system includes a set of brakes for applying pressure to resist the rotation of the respective wheels of the vehicle, a sensor for producing a rollover signal in response to a predetermined force urging the vehicle to rollover, and a control for actuating the brakes in a predetermined program in response to the rollover signal.

In one embodiment of the present invention, the controller actuates both front brakes in response to the rollover signal. In another embodiment of the present invention, the controller brakes the most heavily loaded front tire in response to the rollover signal.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
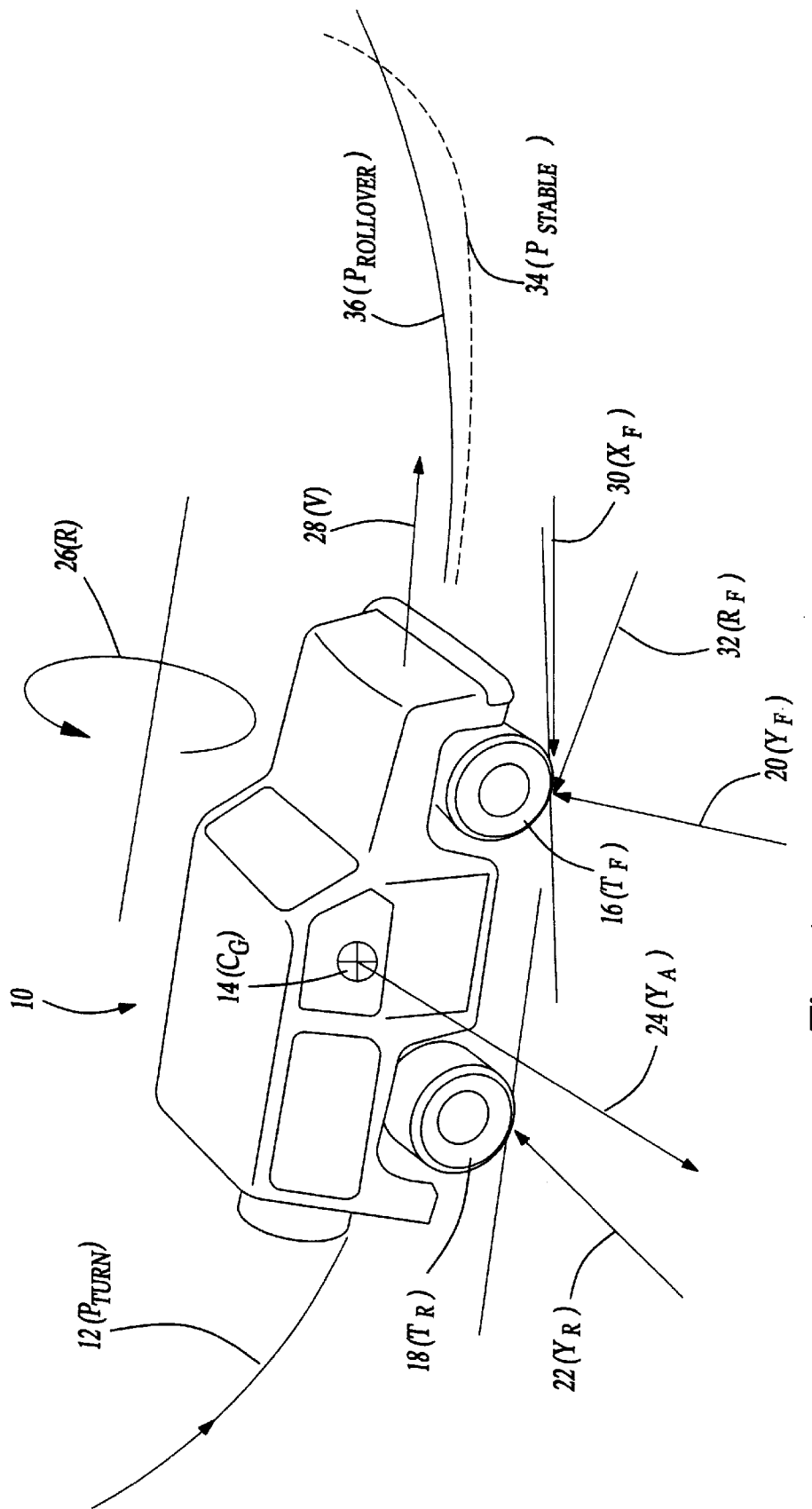
FIG. 1 is a perspective view of a vehicle steered into a sharp turn.

Referring to the Figures, wherein like numerals indicate like or corresponding parts throughout the several views, FIG. 1 shows a perspective view of a vehicle 10 steered into a sharp or severe turn. The path of the turn is generally indicated by 12 ($P_{TURN}$). Typically, the sharpness of the path of the turn 12 ($P_{TURN}$), as shown in FIG. 1, is the result of an emergency steering maneuver.

The vehicle 10 has a center of gravity 14 ($C_G$), a pair of outer tires 16 ($T_F$) and 18 ($T_R$), and a pair of inner tires (not shown). During the sharp turn, the outer tires 16 ($T_F$) and 18 ($T_R$) create a front lateral force, generally indicated by 20 ($Y_F$), and a rear lateral force, generally indicated by 22 ($Y_R$), respectively. The front lateral force 20 ($Y_F$) and the rear lateral force 22 ($Y_R$) produce an opposing D'Alembert force, generally indicated by 24 ($Y_A$), on the center of gravity 14 ($C_G$) of the vehicle 10. The front lateral force 20 ($Y_F$) and the rear lateral force 22 ($Y_R$) combine with the D'Alembert force 24 ($Y_A$) to roll the vehicle 10 outward with respect to the radius or the path of the turn 12 ($P_{TURN}$). The outward direction of the roll is generally indicated by 26 (R). The lateral forces on the inner tires of the vehicle 10 are negligible at the inception of a rollover and, therefore, not shown or described.

When the combination of the lateral forces 20 ($Y_F$) and 22 ($Y_R$) and the D'Alembert force 24 ($Y_A$) rises above a critical amount of force, the vehicle 10 will rollover. In this manner, a sharp or severe turn of the vehicle 10 can solely induce a friction rollover on a dry, flat road. The amount of force required to roll a specific vehicle model over is determined by many factors including the ratio of track width to center of gravity height. The amount of lateral force 20 ($Y_F$) and 22 ($Y_R$) created by each outer tire 16 ($T_F$) and 18 ($T_R$) respectively is determined in part by the slip angle and the coefficient of friction of each outer tire 16 ($T_F$) and 18 ($T_R$). The lateral forces 20 ($Y_F$) and 22 ($Y_R$) create a lateral acceleration on the center of mass 14 ($C_G$) of the vehicle 10. The lateral forces 20 ($Y_F$) and 22 ($Y_R$), the lateral acceleration, and the speed of the vehicle, generally indicated by 28 (V), combine to establish the sharpness of the turn. To prevent a friction rollover, the present invention reduces the lateral forces 20 ($Y_F$) and 22 ($Y_R$) on the outer tires 16 ($T_F$) and 18 ($T_R$) respectively.

Braking the outer front tire 16 ($T_F$) during the sharp turn prevents a friction rollover in two ways. First, braking the outer front tire 16 ($T_F$) produces a longitudinal or brake force, generally indicated by 30 ($X_F$). During the sharp or severe turn, the outer front tire 16 ($T_F$) is heavily loaded and the inner front tire (not shown) is lightly loaded. As a result, the longitudinal force 30 ($X_F$) is much greater than the negligible longitudinal force created when the inner front tire is braked. The large longitudinal force 30 ($X_F$) causes a restoring torque to counteract the yaw or turning of the vehicle 10. As a result, the initial sharpness of the path of the turn 12 ($P_{TURN}$) is limited. Second, the relationship between the longitudinal force 30 ($X_F$) and the front lateral force 20 ($Y_F$), referred to as the friction circle, establishes that the outer front tire 16 ($T_F$) can produce only a limited amount of total force, generally indicated by a resultant force 32 ($R_F$). Accordingly, the creation of the longitudinal force 30 ($X_F$) by braking the outer front tire 16 ($T_F$) reduces the amount of the front lateral force 20 ($Y_F$) that the outer front tire 16 ($T_F$) can produce. Due to the reduction of the front lateral force 20 ($Y_F$), the rear lateral force 22 ($Y_R$) is greater than the front lateral force 20 ($Y_F$) thereby causing the vehicle 10 to act like a weather vane and limiting the initial sharpness of the path of the turn 12 ($P_{TURN}$).

If the outer front tire 16 ($T_F$) is braked during the turn, the vehicle 10 will follow an initially limited or stable path through the turn. The initially limited or stable path through the turn is generally indicated by 34 ($P_{STABLE}$). If the outer front tire 16 ($T_F$) is not braked during the turn, the vehicle 10 will follow a rollover path. The rollover path is generally indicated by 36 ($P_{ROLLOVER}$). As shown in FIG. 1, initially the rollover path 36 ($P_{ROLLOVER}$) is sharper or "tighter" than the stable path 34 ($P_{STABLE}$). However, braking the outer front tire 16 ($T_F$) during the turn results in a controlled turn 34 ($P_{STABLE}$) which is as "tight" as safely possible and ultimately sharper than a non-braking turn 36 ($P_{ROLLOVER}$). Alternatively, in less complex brake systems, both front tires 16 ($T_F$) and 18 ($T_R$) may be braked during the turn to the achieve similar friction rollover prevention results.

Figure 2:
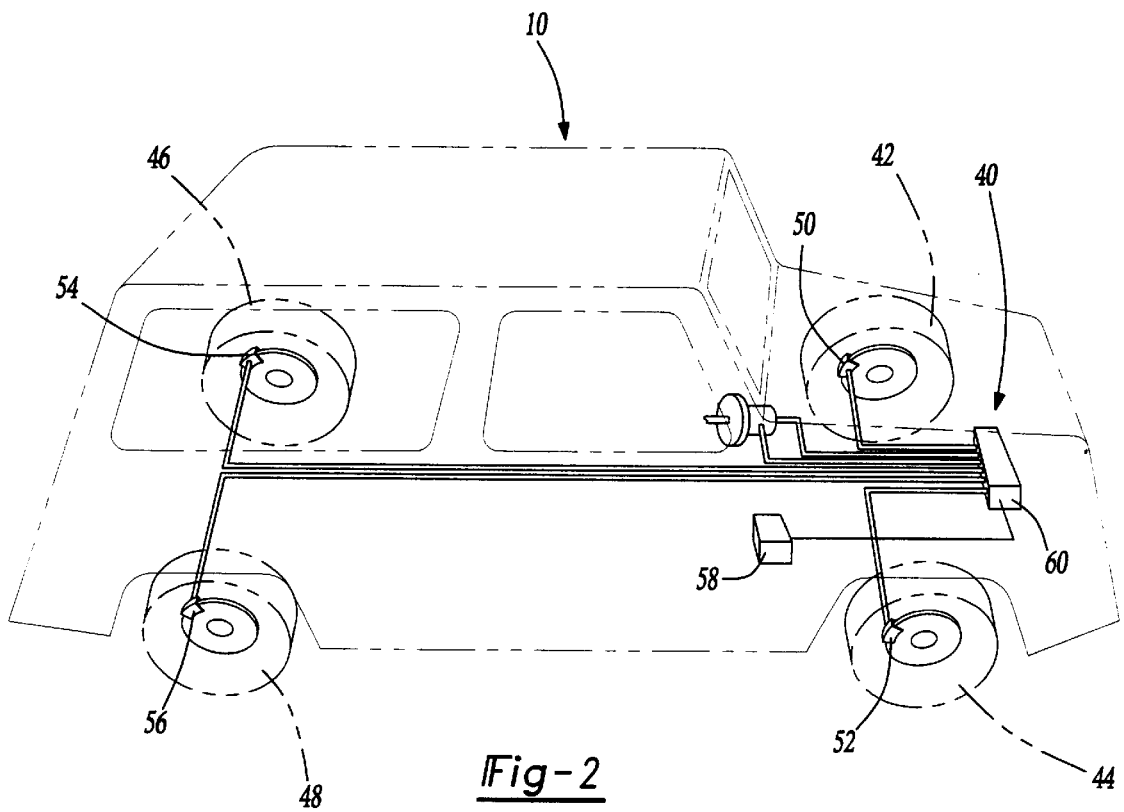
FIG. 2 is a perspective view of the vehicle including an anti-rollover brake system in accordance with the present invention.

FIG. 2 is a perspective view of the vehicle 10 shown in phantom lines including an anti-rollover brake system 40 in accordance with the present invention. The vehicle 10 has a pair of front wheels 42 and 44 and a pair of rear wheels 46 and 48 shown in phantom lines in FIG. 2. The brake system 40 includes a set of brakes 50, 52, 54, and 56, a sensor 58, and a control 60. The brakes 50, 52, 54, and 56 apply pressure to resist the rotation of the wheels 42, 44, 46, and 48 respectively. The sensor 58 produces a rollover signal in response to a predetermined force urging the vehicle 10 to rollover. As described above, the sensor 58 is designed to produce the rollover signal when the vehicle 10 is steered into a sharp turn which, if continued, will induce a friction rollover of the vehicle 10. Preferably, the sensor 58 produces the rollover signal in response to a lateral acceleration of the center of mass of the vehicle 10 urging the vehicle 10 to rollover. The control 60 actuates the brakes 50, 52, 54, and 56 in a predetermined program in response to the rollover signal. Similar to conventional traction control brake systems, the control 60 must be capable of actuating the brakes 50, 52, 54, and 56 without the depression of a brake pedal. In conventional power assisted brake systems, engine vacuum or hydraulic power from a power steering pump is used to apply the brakes. In a preferred embodiment of the present invention, the brake control 60 is also capable of actuating each brake 50, 52, 54, and 56 independently.

In accordance with the present invention, there are several ways to measure the predetermined force urging the vehicle 10 to rollover. In one embodiment of the present invention, the sensor 58 consists of an accelerometer for measuring a lateral acceleration of the vehicle 10. In a second embodiment of the present invention, the sensor 58 is an instrument for measuring the body roll angle of the vehicle 10. The instrument used to measure the body roll angle of the vehicle 10 may consist of an accelerometer, a gyroscope, a roll rate sensor, or other like sensor.

Figure 3:
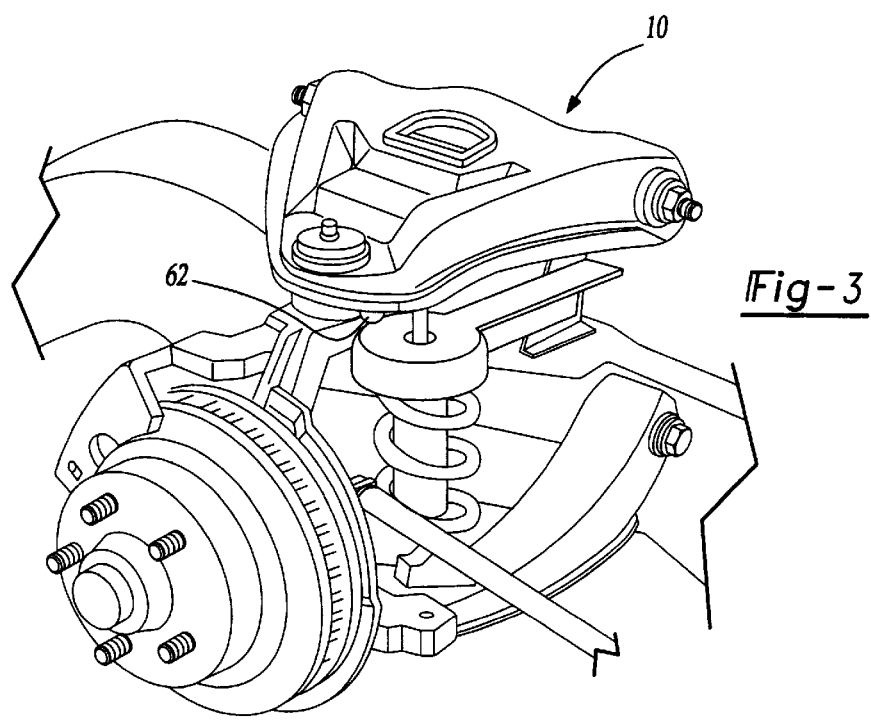
FIG. 3 is a fragmentary perspective view of the vehicle including a rebound bumper having an integral switch for producing a rollover signal in accordance with the present invention.

In a third embodiment of the present invention, the vehicle 10 includes a pair of rebound bumpers positioned on opposite sides of the vehicle 10 near a wheel 42 or 46 and 44 or 48. In this embodiment, the sensor 58 consists of a pair of switches for signaling compression of either of the rebound bumpers. A fragmentary perspective view of the vehicle 10 including one rebound bumper 62 having an integral switch (not shown) for producing the rollover signal in accordance with the present invention is shown in FIG. 3. When the vehicle 10 is steered into a sharp turn which will induce a friction rollover, one of the rebound bumpers will fully compress just prior to the respective wheel 42 or 46 and 44 or 48 lifting off the road initiating the rollover. When the vehicle 10 is heavily loaded with occupants or cargo, detecting wheel lift or measuring body roll angle are extremely accurate ways to predict an impending friction rollover.

The brake control 60 is capable of actuating all four brakes 50, 52, 54, and 56 in accordance with a predetermined program. In a first preferred embodiment of the present invention, the control 60 is programmed to actuate both front brakes 50 and 52 in response to the rollover signal. In a second preferred embodiment of the present invention, the control 60 is programmed to actuate one of the front brakes 50 or 52 based upon the direction of the predetermined force. Specifically, the control 60 will brake the most heavily loaded front wheel 42 or 44. If the sensor 58 is an accelerometer measuring lateral acceleration, then the control 60 will actuate the front brake 50 or 52 in the direction opposite the measured lateral acceleration. If the sensor 58 is an instrument measuring the body roll angle of the vehicle 10, then the control 60 will actuate the front brake 50 or 52 in the direction of the roll. If the sensor 58 is a rebound bumper compression switch signaling wheel lift, then the control 60 will actuate the front brake 50 or 52 opposite the signaling or lifted wheel 42, 44, 46, or 48. To increase the ability to steer the vehicle 10 out of the turn, the control 60 is also capable of releasing or deactuating any actuated brake 50, 52, 54, or 56.

In accordance with the present invention, the control 60 can actuate the brakes 50, 52, 54, and 56 to apply a maximum amount of brake pressure to resist the rotation of the wheels 42, 44, 46, and 48 respectively. Typically, a maximum amount of brake pressure would "lock" the braked wheel 42, 44, 46, or 48. In a preferred embodiment of the present invention, the control 60 actuates the brakes 50, 52, 54, and 56 to apply an amount of brake pressure proportional to the measured lateral acceleration of the vehicle 10. Typically, a proportional amount of brake pressure would not "lock" any wheel 42, 44, 46, or 48 during the brake actuation and, thereby, increase the ability to steer the vehicle 10 out of the turn.

In accordance with the present invention, a method for preventing the rollover of a vehicle 10 having wheels 42, 44, 46, and 48 is disclosed. As will be appreciated by one of ordinary skill in the art, the order of the steps of the method is not important to achieving the objects of the present invention. As will also be recognized, the method may be performed in software, hardware, or a combination of both as in the preferred embodiment of the invention.

The steps of the method include: providing a set of brakes 50, 52, 54, and 56 for applying pressure to resist the rotation of the wheels 42, 44, 46, and 48 of the vehicle 10; providing a sensor 58 for sensing an impending rollover condition; providing a control 60 for actuating the brakes 50, 52, 54, and 56; sensing an impending rollover condition; and braking the wheels 42, 44, 46, and 48 of the vehicle 10 in response to sensing the impending rollover condition.

Prior to the step of sensing the impending rollover condition, the method may further include the step of determining a critical amount of force to roll the vehicle 10 over during a turn. Accordingly, the step of sensing the impending rollover condition may then be further defined as measuring a predetermined amount of force less than the critical amount of force and the step of braking the wheels 42, 44, 46, and 48 may be further defined as braking the wheels 42, 44, 46, and 48 in response to measuring the predetermined amount of force. For example, if it is determined that a specific vehicle model is susceptible to a friction rollover when a lateral acceleration on the vehicle's center of mass measures 0.8 g's, then the critical amount of force to roll the vehicle over would be 0.8 g's and the predetermined amount of force would be an amount less than the critical amount of force (0.8 g's), such as 0.75 g's. Therefore, at a lateral acceleration of 0.75 g's, the control 58 would actuate the appropriate brakes.

In a first embodiment of the method, the step of providing the sensor 58 is further defined as providing an accelerometer for measuring the amount of lateral acceleration placed on the center of mass of the vehicle 10. Accordingly, the step of sensing the impending rollover condition may then be further defined as measuring a predetermined critical amount of lateral acceleration placed on the center of mass of the vehicle 10 and the step of braking the wheels 42, 44, 46, and 48 may be further defined as braking the wheels 42, 44, 46, and 48 in response to measuring the predetermined critical amount of lateral acceleration placed on the center of gravity of the vehicle 10.

In a second embodiment of the method, the vehicle 10 includes a pair of rebound bumpers 62 positioned near a wheel 42 or 46 and 44 or 48 on opposite sides of the vehicle 10 and the step of providing the sensor 58 is further defined as providing a switch for signaling compression of either of the rebound bumpers 62. Accordingly, the step of sensing an impending rollover condition may then be further defined as sensing compression of either of the rebound bumpers 62 and the step of braking the wheels 42, 44, 46, and 48 may be further defined as braking the wheels 42, 44, 46, and 48 in response to sensing compression of either of the rebound bumpers 62.

In a third embodiment of the method, the step of providing the sensor 58 is further defined as providing an accelerometer, a gyroscope, or a roll rate sensor to measure the roll angle of the vehicle 10. Accordingly, the step of sensing the impending rollover condition may then be further defined as measuring a predetermined critical roll angle of the vehicle 10 and the step of braking the vehicle 10 may be further defined as braking the vehicle 10 in response to measuring the predetermined critical roll angle.

In alternative embodiments of the method, the step of braking the wheels 42, 44, 46, and 48 may be further defined as applying a maximum amount of pressure to the wheels 42, 44, 46, and 48 or applying an amount of pressure to the wheels 42, 44, 46, and 48 proportional to the lateral acceleration placed on the center of gravity of the vehicle 10, rebound bumper compression, or roll angle.

When the vehicle 10 includes a pair of front wheels 42 and 44 and a pair of front brakes 50 and 52, the step of braking the wheels 42, 44, 46, and 48 may be further defined as braking the front wheels 42 and 44. Alternatively, prior to the step of braking the wheels 42, 44, 46, and 48, the method may further include the step of determining which front wheel 42 or 44 is loaded with the largest amount of lateral force. Accordingly, the step of braking the wheels 42, 44, 46, and 48 may then be further defined as braking the front wheel 42 or 44 loaded with the largest amount of lateral force.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A brake system for a vehicle having front and rear wheels, the system comprising:
   a set of brakes for applying pressure to resist the rotation of the front and rear wheels, said set of brakes including a front set of brakes for applying pressure to resist the rotation of said front wheels and a rear set of brakes for applying pressure to resist the rotation of said rear wheels;
   a sensor for producing a rollover signal in response to a predetermined force urging the vehicle to rollover; and
   a control for applying said front set of brakes in a predetermined program in response to said rollover signal.

2. A brake system as set forth in claim 1 wherein said predetermined force is proportional to a lateral acceleration of the vehicle.

3. A brake system as set forth in claim 1 wherein said control actuates said brakes to apply a maximum amount of pressure.

4. A brake system as set forth in claim 2 wherein said control actuates said brakes to apply an amount of pressure proportional to said lateral acceleration.

5. A brake system as set forth in claim 1 wherein the vehicle includes a pair of front wheels and a pair of front brakes and said control actuates the pair of front brakes.

6. A brake system as set forth in claim 1 wherein the vehicle includes a pair of front wheels and a pair of front brakes and said control actuates one of the front brakes based upon the direction of said predetermined force.

7. A brake system as set forth in claim 1 wherein said sensor comprises an accelerometer for measuring lateral acceleration of the vehicle.

8. A brake system as set forth in claim 1 wherein said sensor comprises an instrument for measuring the roll angle of the vehicle.

9. A brake system as set forth in claim 8 wherein said instrument comprises one of an accelerometer, a gyroscope, a roll rate sensor, and sensors measuring the distance between the vehicle and the wheels.

10. A brake system as set forth in claim 1 wherein the vehicle includes a pair of rebound bumpers positioned near a wheel on opposite sides of the vehicle and said sensor comprises a pair of switches for signaling compression of either of said rebound bumpers.

11. A method for preventing a rollover of a vehicle having at least a pair of front wheels and a pair of rear wheels, the steps of the method comprising:
   providing a set of front brakes; said front brakes including an independently actuable brake for each front wheel for separately applying pressure to resist the rotation of each of the front wheels;
   providing a sensor for sensing an impending rollover condition;
   providing a control for actuating at least one of said independently actuable brakes;

sensing an impending rollover condition; and applying said at least one independently actuable brake, braking at least one of said front wheels of the vehicle in response to sensing the impending rollover condition, said control acting independently of other vehicle control systems.

12. A method as set forth in claim 11 including the step of determining a critical amount of force to roll the vehicle over during a turn prior to the step of sensing the impending rollover condition.

13. A method as set forth in claim 12 wherein the step of sensing the impending rollover condition is further defined as measuring a predetermined amount of force less than the critical amount of force.

14. A method as set forth in claim 13 wherein the step of braking the wheels is further defined as braking the wheels in response to measuring the predetermined amount of force.

15. A method as set forth in claim 11 wherein the step of providing the sensor is further defined as providing an accelerometer for measuring the amount of lateral acceleration placed on the vehicle.

16. A method as set forth in claim 15 wherein the step of sensing the impending rollover condition is further defined as measuring a predetermined critical amount of lateral acceleration placed on the vehicle.

17. A method as set forth in claim 16 wherein the step of braking the wheels is further defined as braking the wheels in response to measuring the predetermined critical amount of lateral acceleration placed on the center of gravity of the vehicle.

18. A method as set forth in claim 11 wherein the vehicle includes a pair of rebound bumpers positioned near a wheel on opposite sides of the vehicle and the step of providing the sensor is further defined as providing a switch for signaling compression of either of the rebound bumpers.

19. A method as set forth in claim 18 wherein the step of sensing an impending rollover condition is further defined as sensing compression of either of the rebound bumpers.

20. A method as set forth in claim 19 wherein the step of braking the wheels is further defined as braking the wheels in response to sensing compression of either of the rebound bumpers.

21. A method as set forth in claim 11 wherein the step of providing the sensor is further defined as providing one of an accelerometer, a gyroscope, a roll rate sensor, and sensors measuring the distance between the vehicle and the wheels to measure the roll angle of the vehicle.

22. A method as set forth in claim 21 wherein the step of sensing the impending rollover condition is further defined as measuring a predetermined critical roll angle of the vehicle.

23. A method as set forth in claim 22 wherein the step of braking the vehicle is further defined as braking the vehicle in response to measuring the predetermined critical roll angle.

24. A method as set forth in claim 11 wherein the step of braking the wheels is further defined as applying a maximum amount of pressure to the wheels.

25. A method as set forth in claim 15 wherein the step of braking the wheels is further defined as applying an amount of pressure to the wheels proportional to the lateral acceleration placed on the center of gravity of the vehicle.

26. A method as set forth in claim 11 wherein the vehicle includes a pair of front wheels and a pair of front brakes and the step of braking the wheels is further defined as braking the front wheels.

27. A method as set forth in claim 11 wherein the vehicle includes a pair of front wheels and a pair of front brakes and the method further includes the step of determining the front wheel loaded with the largest amount of lateral force prior to the step of braking the wheels.

28. A method as set forth in claim 27 wherein the step of braking the wheels is further defined as braking the front wheel loaded with the largest amount of lateral force.

* * * * *